Patented June 3, 1947

2,421,436

UNITED STATES PATENT OFFICE 2,421,436

ADHESIVE FOR JOINING OPTICAL ELEMENTS

John T. Rooney, Buffalo, N. Y., assignor, by mesne assignments, to American Optical Company, Southbridge, Mass., a voluntary association No Drawing. Application May 3, 1944, Serial No. 533,945

2 Claims. (Cl. 106—173)

This invention relates to a new and improved adhesive or cement particularly adapted for the joining of optical elements and more particularly to an adhesive for this purpose that will not be as brittle as the hard resins previously employed and which will not be affected by relatively low temperatures.

An object of the invention is to provide a new and improved adhesive or cement for joining optical elements which will not be affected by relatively low temperatures and which will be tougher and less brittle than prior adhesives.

Another object of the invention is to provide a new and improved adhesive or cement for joining optical elements which is highly transparent and stable, and which is odorless and retains its toughness from relatively low to relatively high temperatures.

Other objects and advantages of the invention will be apparent from the following specification. It will be understood that many changes may be made in the adhesive without departing from the spirit of the invention as expressed in the accompanying claims. I, therefore, do not wish to be limited to the exact details and composition described as the preferred embodiment has been given by way of illustration only.

In the past, the most popular and commonly used adhesive for joining together optical elements has been Canada balsam.

While for most general purposes Canada balsam has proven quite satisfactory, it has been found to possess a number of faults. Among these was its brittleness and failure to stand low temperatures. Where an optical member consisting of a plurality of elements joined by Canada balsam was dropped or received other severe shock, the Canada balsam being friable was easily broken or crumbled.

Also, where such an optical member was subjected to low temperatures, such as below zero temperatures, the Canada balsam assumed a needle like appearance and checked, interfering with the good optical performance of the optical system.

It is, therefore, the object of this invention to provide an adhesive for joining optical elements which overcomes the above brittleness and checking faults of Canada balsam.

The adhesive of the present invention consists of a combination of Canada balsam and ethyl cellulose.

The ethyl cellulose may be incorporated with the Canada balsam in the proportion of one per cent to approximately fifteen per cent ethyl cellulose with 99 to 85 per cent Canada balsam. An adhesive or cement consisting of approximately ten per cent low viscosity ethyl cellulose with approximately 90 per cent Canada balsam has been found to be entirely satisfactory.

The amount of ethyl cellulose employed is limited by the maximum miscibility of the ethyl cellulose in the Canada balsam and the advantages are proportional to the amount of ethyl cellulose used.

The cement may be heated to obtain the desired consistency. Although it has been found that the ethyl cellulose will readily dissolve in the Canada balsam if it is mixed therewith before the heat treating of the Canada balsam, it is possible to mix the ethyl cellulose with the Canada balsam after the Canada balsam has been heat treated to the desired consistency.

Due to the fact that the index of refraction of the ethyl cellulose is lower than that of Canada balsam which has an index of refraction somewhat higher than crown glass, the mixture of ethyl cellulose with the Canada balsam tends to bring the index of refraction of the adhesive or cement nearer to the index of refraction of the crown glass thereby increasing the homogeneity and optical properties of the cemented optical member.

Ethyl cellulose having ethoxyl content of from 46.8 per cent to 48.5 per cent has been found to be satisfactory although other grades may be employed.

The ethyl cellulose is highly transparent and stable and retains its toughness from relatively low to relatively high temperatures and imparts these qualities to the resulting cement or adhesive.

The adhesive or cement of this invention may be employed for joining optical elements of all types such as lenses and prisms.

From the foregoing it will be seen that I have provided simple, efficient and economical means for obtaining all of the objects and advantages of the invention.

Having described my invention, I claim:

1. An adhesive or cement for joining optical elements, said adhesive or cement being transparent, highly adherent to glass and consisting of from approximately 85 to 99 per cent of Canada balsam mixed with approximately one to 15 per cent of ethyl cellulose.

2. An adhesive or cement for joining optical elements, said adhesive or cement being transparent, highly adherent to glass and consisting of approximately 90 per cent Canada balsam and approximately 10 per cent ethyl cellulose.

JOHN T. ROONEY.

REFERENCES CITED

The following references are of record in the file of this patent:

UNITED STATES PATENTS

| Number | Name | Date |
|---|---|---|
| 2,179,339 | Little | Nov. 7, 1939 |
| 2,060,104 | Moulton | Nov. 10, 1936 |

FOREIGN PATENTS

| Number | Country | Date |
|---|---|---|
| 476,991 | France | June 21, 1915 |

OTHER REFERENCES

"Properties and Uses of Ethyl Cellulose," Koch, Industrial and Engineering Chemistry, June 1937, pages 687–690. (Copy in Scientific Library.)